United States Patent
Lee et al.

(10) Patent No.: US 8,780,702 B2
(45) Date of Patent: Jul. 15, 2014

(54) ADAPTIVE MULTI-REDUNDANT RING NETWORK SYSTEM AND METHOD FOR SELECTING DETOUR

(75) Inventors: Soo Gang Lee, Gyeonggi-do (KR); Young Chan Kwon, Suwon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 239 days.

(21) Appl. No.: 13/343,665

(22) Filed: Jan. 4, 2012

(65) Prior Publication Data

US 2012/0188869 A1    Jul. 26, 2012

(30) Foreign Application Priority Data

Jan. 20, 2011 (KR) .................. 10-2011-0005928

(51) Int. Cl.
*G01R 31/08* (2006.01)

(52) U.S. Cl.
USPC .......................................... 370/228

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | | |
|---|---|---|---|---|
| 2003/0140109 A1* | 7/2003 | Pospesel et al. | ............... | 709/208 |
| 2007/0104093 A1* | 5/2007 | Li et al. | .................. | 370/223 |
| 2007/0230487 A1* | 10/2007 | Tanaka | ........................ | 370/404 |
| 2009/0219808 A1* | 9/2009 | Ogura | ........................ | 370/223 |
| 2009/0235001 A1* | 9/2009 | Buttner et al. | ............... | 710/110 |
| 2009/0292845 A1* | 11/2009 | Buttner et al. | ............... | 710/110 |
| 2009/0316588 A1* | 12/2009 | Nakamura | ................. | 370/249 |
| 2010/0098071 A1* | 4/2010 | Zhang | ........................ | 370/389 |
| 2010/0265820 A1 | 10/2010 | Feng et al. | | |
| 2011/0116365 A1* | 5/2011 | Wu et al. | .................. | 370/223 |
| 2013/0021901 A1* | 1/2013 | Ding et al. | ................. | 370/225 |

FOREIGN PATENT DOCUMENTS

| | | |
|---|---|---|
| CN | 1753385 | 3/2006 |
| JP | 57-67446 | 4/1982 |

OTHER PUBLICATIONS

Japan Patent Office Application Serial No. 2012-009037, Office Action dated Mar. 12, 2013, 2 pages.
The State Intellectual Property Office of the People's Republic of China Application No. 201210022805.7, Office Action dated Feb. 27, 2014, 8 pages.

* cited by examiner

*Primary Examiner* — Jung-Jen Liu
(74) *Attorney, Agent, or Firm* — Lee, Hong, Degerman, Kang & Waimey

(57) ABSTRACT

Disclosed is an adaptive multi-redundant ring network system using a 2 port Ethernet communication module capable of selecting a path, the network system including a main network system including a first main control unit and a plurality of first slaves; and a sub-network system including a second main control unit and a plurality of second slaves, wherein each of the plurality of first slaves and each of the plurality of second slaves include 2-port Ethernet communication modules, and each of the plurality of first slaves, each of the plurality of second slaves, the first slave and the second slave are selectively connected via the 2-port Ethernet communication modules.

5 Claims, 20 Drawing Sheets

FIG. 9

| | My_SN | p0_SN | p1_SN | p0_LNM | p1_LNM | RNMp | RNMs | node_cnt | \multicolumn{8}{c|}{p0_hop} | \multicolumn{7}{c|}{p1_hop} |
|---|---|---|---|---|---|---|---|---|---|---|---|---|---|---|---|---|---|---|---|---|---|---|
| | | | | | | | | | Manager_A | Slave1_A | Slave2_A | Slave3_A | Slave4_A | Slave5_A | Slave6_A | Manager_A | Slave1_A | Slave2_A | Slave3_A | Slave4_A | Slave5_A | Slave6_A |
| Manager_A | 128 | 1 | 6 | – | – | 128 | 6 | 7 | 7 | 1 | 2 | 3 | 4 | 5 | 6 | 7 | 6 | 5 | 4 | 3 | 2 | 1 |
| Slave1_A | 1 | 2 | 128 | – | – | 128 | 6 | 7 | 6 | 7 | 1 | 2 | 3 | 4 | 5 | 5 | 4 | 5 | 6 | 4 | 3 | 2 |
| Slave2_A | 2 | 3 | 1 | – | – | 128 | 6 | 7 | 5 | 6 | 7 | 1 | 2 | 3 | 4 | 4 | 5 | 6 | 7 | 5 | 4 | 3 |
| Slave3_A | 3 | 4 | 2 | – | – | 128 | 6 | 7 | 4 | 5 | 6 | 7 | 1 | 2 | 3 | 3 | 4 | 5 | 6 | 7 | 5 | 4 |
| Slave4_A | 4 | 5 | 3 | – | – | 128 | 6 | 7 | 3 | 4 | 5 | 6 | 7 | 1 | 2 | 2 | 3 | 4 | 5 | 6 | 7 | 5 |
| Slave5_A | 5 | 6 | 4 | – | – | 128 | 6 | 7 | 2 | 3 | 4 | 5 | 6 | 7 | 1 | 1 | 2 | 3 | 4 | 5 | 6 | 7 |
| Slave6_A | 6 | 128 | 5 | – | – | 128 | 6 | 7 | 1 | 2 | 3 | 4 | 5 | 6 | 7 | 7 | 1 | 2 | 3 | 4 | 5 | 6 |

| | My_SN | p0_SN | p1_SN | p0_LNM | p1_LNM | RNMp | RNMs | node_cnt | \multicolumn{8}{c|}{p0_hop} | \multicolumn{7}{c|}{p1_hop} |
|---|---|---|---|---|---|---|---|---|---|---|---|---|---|---|---|---|---|---|---|---|---|---|
| | | | | | | | | | Manager_B | Slave1_B | Slave2_B | Slave3_B | Slave4_B | Slave5_B | Slave6_B | Manager_B | Slave1_B | Slave2_B | Slave3_B | Slave4_B | Slave5_B | Slave6_B |
| Manager_B | 192 | 65 | 70 | – | – | 192 | 70 | 7 | 7 | 1 | 2 | 3 | 4 | 5 | 6 | 7 | 6 | 5 | 4 | 3 | 2 | 1 |
| Slave1_B | 65 | 66 | 192 | – | – | 192 | 70 | 7 | 6 | 7 | 1 | 2 | 3 | 4 | 5 | 5 | 4 | 5 | 6 | 4 | 3 | 2 |
| Slave2_B | 66 | 67 | 65 | – | – | 192 | 70 | 7 | 5 | 6 | 7 | 1 | 2 | 3 | 4 | 4 | 5 | 6 | 7 | 5 | 4 | 3 |
| Slave3_B | 67 | 68 | 66 | – | – | 192 | 70 | 7 | 4 | 5 | 6 | 7 | 1 | 2 | 3 | 3 | 4 | 5 | 6 | 7 | 5 | 4 |
| Slave4_B | 68 | 69 | 67 | – | – | 192 | 70 | 7 | 3 | 4 | 5 | 6 | 7 | 1 | 2 | 2 | 3 | 4 | 5 | 6 | 7 | 5 |
| Slave5_B | 69 | 70 | 68 | – | – | 192 | 70 | 7 | 2 | 3 | 4 | 5 | 6 | 7 | 1 | 1 | 2 | 3 | 4 | 5 | 6 | 7 |
| Slave6_B | 70 | 192 | 69 | – | – | 192 | 70 | 7 | 1 | 2 | 3 | 4 | 5 | 6 | 7 | 7 | 1 | 2 | 3 | 4 | 5 | 6 |

FIG. 11

| | My_SN | p0_SN | p1_SN | p0_LNM | p1_LNM | RNMp | RNMs | node_cnt | p0_hop | | | | | | | p1_hop | | | | | | |
|---|---|---|---|---|---|---|---|---|---|---|---|---|---|---|---|---|---|---|---|---|---|---|
| | | | | | | | | | Manager_A | Slave1_A | Slave2_A | Slave3_A | Slave4_A | Slave5_A | Slave6_A | Manager_A | Slave1_A | Slave2_A | Slave3_A | Slave4_A | Slave5_A | Slave6_A |
| Manager_A | 128 | 1 | 6 | 1 | 2 | - | - | 7 | - | 1 | - | - | - | - | - | - | - | 5 | 4 | 3 | 2 | 1 |
| Slave1_A | 1 | - | 128 | 1 | 2 | - | - | 7 | 1 | - | - | - | - | - | - | 6 | - | - | - | - | - | - |
| Slave2_A | 2 | 3 | - | 1 | 2 | - | - | 7 | - | - | - | 1 | 2 | 3 | - | 5 | - | - | - | - | - | - |
| Slave3_A | 3 | 4 | 2 | 1 | 2 | - | - | 7 | - | - | 1 | - | 2 | 3 | 4 | 4 | - | - | - | 1 | - | - |
| Slave4_A | 4 | 5 | 3 | 1 | 2 | - | - | 7 | - | - | 2 | 1 | - | 3 | - | 3 | - | 1 | 2 | - | - | - |
| Slave5_A | 5 | 6 | 4 | 1 | 2 | - | - | 7 | - | - | 3 | 2 | 1 | - | - | 2 | - | 2 | 3 | 1 | - | - |
| Slave6_A | 6 | 128 | 5 | 1 | 2 | - | - | 7 | - | - | 4 | 3 | 2 | 1 | - | 1 | - | 3 | 4 | 2 | 1 | - |

| | My_SN | p0_SN | p1_SN | p0_LNM | p1_LNM | RNMp | RNMs | node_cnt | p0_hop | | | | | | | p1_hop | | | | | | |
|---|---|---|---|---|---|---|---|---|---|---|---|---|---|---|---|---|---|---|---|---|---|---|
| | | | | | | | | | Manager_B | Slave1_B | Slave2_B | Slave3_B | Slave4_B | Slave5_B | Slave6_B | Manager_B | Slave1_B | Slave2_B | Slave3_B | Slave4_B | Slave5_B | Slave6_B |
| Manager_B | 192 | 65 | 70 | - | - | 192 | 70 | 7 | 7 | 1 | 2 | 3 | 4 | 5 | 6 | 7 | 6 | 5 | 4 | 3 | 2 | 1 |
| Slave1_B | 65 | 66 | 192 | - | - | 192 | 70 | 7 | 6 | 7 | 1 | 2 | 3 | 4 | 5 | 1 | 7 | 6 | 5 | 4 | 3 | 2 |
| Slave2_B | 66 | 67 | 65 | - | - | 192 | 70 | 7 | 5 | 6 | 7 | 1 | 2 | 3 | 4 | 2 | 1 | 7 | 6 | 5 | 4 | 3 |
| Slave3_B | 67 | 68 | 66 | - | - | 192 | 70 | 7 | 4 | 5 | 6 | 7 | 1 | 2 | 3 | 3 | 2 | 1 | 7 | 6 | 5 | 4 |
| Slave4_B | 68 | 69 | 67 | - | - | 192 | 70 | 7 | 3 | 4 | 5 | 6 | 7 | 1 | 2 | 4 | 3 | 2 | 1 | 7 | 6 | 5 |
| Slave5_B | 69 | 70 | 68 | - | - | 192 | 70 | 7 | 2 | 3 | 4 | 5 | 6 | 7 | 1 | 5 | 4 | 3 | 2 | 1 | 7 | 6 |
| Slave6_B | 70 | 192 | 69 | - | - | 192 | 70 | 7 | 1 | 2 | 3 | 4 | 5 | 6 | 7 | 6 | 5 | 4 | 3 | 2 | 1 | 7 |

FIG. 13

| | My_SN | p0_SN | p1_SN | p0_LNM | p1_LNM | RNMp | RNMs | node_cnt | p0_hop ||||||||| p1_hop |||||||
|---|---|---|---|---|---|---|---|---|---|---|---|---|---|---|---|---|---|---|---|---|---|---|
| | | | | | | | | | Manager_A | Slave1_A | Slave2_A | Slave3_A | Slave4_A | Slave5_A | Slave6_A | Manager_A | Slave1_A | Slave2_A | Slave3_A | Slave4_A | Slave5_A | Slave6_A |
| Manager_A | 128 | 1 | 6 | 1 | 5 | – | – | 4 | – | – | – | – | – | – | 1 | – | – | – | – | – | 2 | 1 |
| Slave1_A | 1 | – | 128 | 1 | 5 | – | – | 4 | – | – | – | – | – | – | 1 | 1 | – | – | – | – | 3 | 2 |
| Slave2_A | 2 | 3 | – | 4 | 2 | – | – | 3 | – | 1 | – | – | – | – | – | – | – | – | – | – | – | – |
| Slave3_A | 3 | 4 | 2 | 4 | 2 | – | – | 3 | – | – | 1 | 2 | – | – | – | – | – | – | 1 | – | – | – |
| Slave4_A | 4 | – | 3 | 4 | 2 | – | – | 3 | – | – | – | 1 | – | – | – | – | – | 1 | – | – | – | – |
| Slave5_A | 5 | 6 | – | 1 | 5 | – | – | 4 | 2 | 3 | – | – | – | – | 1 | – | – | – | – | – | – | – |
| Slave6_A | 6 | 128 | 5 | 1 | 5 | – | – | 4 | 1 | – | – | – | – | 1 | – | – | 2 | – | – | – | 1 | – |

| | My_SN | p0_SN | p1_SN | p0_LNM | p1_LNM | RNMp | RNMs | node_cnt | p0_hop ||||||||| p1_hop |||||||
|---|---|---|---|---|---|---|---|---|---|---|---|---|---|---|---|---|---|---|---|---|---|---|
| | | | | | | | | | Manager_B | Slave1_B | Slave2_B | Slave3_B | Slave4_B | Slave5_B | Slave6_B | Manager_B | Slave1_B | Slave2_B | Slave3_B | Slave4_B | Slave5_B | Slave6_B |
| Manager_B | 192 | 65 | 70 | – | – | 192 | 70 | 7 | 7 | 1 | 2 | 3 | 4 | 5 | 6 | 7 | 6 | 5 | 4 | 3 | 2 | 1 |
| Slave1_B | 65 | 66 | 192 | – | – | 192 | 70 | 7 | 6 | 7 | 1 | 2 | 3 | 4 | 5 | 1 | 7 | 6 | 5 | 4 | 3 | 2 |
| Slave2_B | 66 | 67 | 65 | – | – | 192 | 70 | 7 | 5 | 6 | 7 | 1 | 2 | 3 | 4 | 2 | 1 | 7 | 6 | 5 | 4 | 3 |
| Slave3_B | 67 | 68 | 66 | – | – | 192 | 70 | 7 | 4 | 5 | 6 | 7 | 1 | 2 | 3 | 3 | 2 | 1 | 7 | 6 | 5 | 4 |
| Slave4_B | 68 | 69 | 67 | – | – | 192 | 70 | 7 | 3 | 4 | 5 | 6 | 7 | 1 | 2 | 4 | 3 | 2 | 1 | 7 | 6 | 5 |
| Slave5_B | 69 | 70 | 68 | – | – | 192 | 70 | 7 | 2 | 3 | 4 | 5 | 6 | 7 | 1 | 5 | 4 | 3 | 2 | 1 | 7 | 6 |
| Slave6_B | 70 | 192 | 69 | – | – | 192 | 70 | 7 | 1 | 2 | 3 | 4 | 5 | 6 | 7 | 6 | 5 | 4 | 3 | 2 | 1 | 7 |

FIG. 15

| | My_SN | p0_SN | p1_SN | p0_LNM | p1_LNM | RNMp | RNMs | node_cnt | p0_hop Manager_A | p0_hop Slave1_A | p0_hop Slave2_A | p0_hop Slave3_A | p0_hop Slave4_A | p0_hop Slave5_A | p0_hop Slave6_A | p1_hop Manager_A | p1_hop Slave1_A | p1_hop Slave2_A | p1_hop Slave3_A | p1_hop Slave4_A | p1_hop Slave5_A | p1_hop Slave6_A |
|---|---|---|---|---|---|---|---|---|---|---|---|---|---|---|---|---|---|---|---|---|---|---|
| Manager_A | 128 | 1 | 6 | 1 | 5 | – | – | 4 | – | – | – | – | – | – | – | – | 1 | – | – | – | 2 | 1 |
| Slave1_A | 1 | – | 128 | 1 | 5 | – | – | 4 | – | – | – | – | – | – | – | – | – | – | – | 3 | 2 |
| Slave2_A | 2 | 3 | – | 4 | 2 | – | – | 3 | – | – | – | 1 | – | – | – | – | – | – | – | – | – | – |
| Slave3_A | 3 | 4 | – | 4 | 2 | – | – | 3 | – | – | – | – | 2 | – | 1 | – | – | – | 1 | – | – | – |
| Slave4_A | 4 | – | 3 | 4 | 2 | – | – | 3 | – | – | – | – | 1 | – | – | – | – | – | 2 | – | – | – |
| Slave5_A | 5 | 6 | – | 1 | 5 | – | – | 4 | 2 | 3 | – | – | – | – | – | – | – | – | – | – | – | – |
| Slave6_A | 6 | 128 | 5 | 1 | 5 | – | – | 4 | 1 | – | – | – | – | – | 1 | 1 | – | – | – | – | – | – |

| | My_SN | p0_SN | p1_SN | p0_LNM | p1_LNM | RNMp | RNMs | node_cnt | p0_hop Manager_B | p0_hop Slave1_B | p0_hop Slave2_B | p0_hop Slave3_B | p0_hop Slave4_B | p0_hop Slave5_B | p0_hop Slave6_B | p1_hop Manager_B | p1_hop Slave1_B | p1_hop Slave2_B | p1_hop Slave3_B | p1_hop Slave4_B | p1_hop Slave5_B | p1_hop Slave6_B |
|---|---|---|---|---|---|---|---|---|---|---|---|---|---|---|---|---|---|---|---|---|---|---|
| Manager_B | 192 | 65 | 70 | 66 | 67 | – | – | 7 | – | 1 | 2 | – | – | – | – | – | – | – | 4 | 3 | 2 | 1 |
| Slave1_B | 65 | 66 | 192 | 66 | 67 | – | – | 7 | – | – | 1 | – | – | – | – | – | – | – | 5 | 4 | 3 | 2 |
| Slave2_B | 66 | – | 65 | 66 | 67 | – | – | 7 | 5 | 4 | – | – | – | 2 | 1 | – | – | 1 | 6 | 5 | 4 | 3 |
| Slave3_B | 67 | 68 | – | 66 | 67 | – | – | 7 | 4 | 3 | 6 | – | 1 | – | – | 1 | 2 | – | – | – | – | – |
| Slave4_B | 68 | 69 | 67 | 66 | 67 | – | – | 7 | 3 | 2 | 5 | 1 | – | 3 | 2 | 1 | – | – | – | – | – | – |
| Slave5_B | 69 | 70 | 68 | 66 | 67 | – | – | 7 | 2 | 1 | 4 | – | – | 2 | 1 | – | – | – | – | 1 | – | – |
| Slave6_B | 70 | 192 | 69 | 66 | 67 | – | – | 7 | 1 | – | 3 | – | – | – | – | – | – | – | 3 | 2 | 1 | – |

FIG. 17

| | My_SN | p0_SN | p1_SN | p0_LNM | p1_LNM | RNMp | RNMs | node_cnt | p0_hop Manager_A | Slave1_A | Slave2_A | Slave3_A | Slave4_A | Slave5_A | Slave6_A | p1_hop Manager_A | Slave1_A | Slave2_A | Slave3_A | Slave4_A | Slave5_A | Slave6_A |
|---|---|---|---|---|---|---|---|---|---|---|---|---|---|---|---|---|---|---|---|---|---|---|
| Manager_A | 128 | 1 | 6 | 1 | 5 | - | - | 4 | - | 1 | - | - | - | - | - | - | - | - | - | - | - | 1 |
| Slave1_A | 1 | - | 128 | - | 5 | - | - | 4 | - | - | - | - | - | - | - | - | - | - | - | 2 | 3 | 2 |
| Slave2_A | 2 | 3 | - | 4 | 2 | - | - | 3 | - | - | - | 1 | 2 | - | - | - | - | - | - | - | - | - |
| Slave3_A | 3 | 4 | - | 4 | - | - | - | 3 | - | - | - | - | 1 | - | - | - | - | - | - | - | - | - |
| Slave4_A | 4 | - | 3 | 4 | 2 | - | - | 3 | - | - | - | - | - | - | - | - | 1 | 2 | 1 | - | - | - |
| Slave5_A | 5 | 6 | - | 1 | 5 | - | - | 4 | - | - | 2 | - | - | - | 1 | - | - | - | - | - | - | - |
| Slave6_A | 6 | 128 | 5 | 1 | 5 | - | - | 4 | - | 1 | - | - | - | - | - | 1 | - | - | - | 1 | - | - |

| | My_SN | p0_SN | p1_SN | p0_LNM | p1_LNM | RNMp | RNMs | node_cnt | p0_hop Manager_B | Slave1_B | Slave2_B | Slave3_B | Slave4_B | Slave5_B | Slave6_B | p1_hop Manager_B | Slave1_B | Slave2_B | Slave3_B | Slave4_B | Slave5_B | Slave6_B |
|---|---|---|---|---|---|---|---|---|---|---|---|---|---|---|---|---|---|---|---|---|---|---|
| Manager_B | 192 | 65 | 70 | 66 | 68 | - | - | 6 | - | 1 | 2 | - | - | - | - | - | - | - | 3 | 2 | 2 | 1 |
| Slave1_B | 65 | 66 | 192 | 66 | 68 | - | - | 6 | - | - | 1 | - | - | - | - | - | - | 1 | 4 | 3 | 3 | 2 |
| Slave2_B | 66 | - | 65 | 66 | 68 | - | - | 6 | - | - | - | 5 | - | - | 2 | - | 1 | - | 5 | 4 | - | 3 |
| Slave3_B | 67 | - | - | - | - | - | - | 1 | - | 4 | - | - | - | - | - | - | - | - | - | - | - | - |
| Slave4_B | 68 | 69 | - | 66 | 68 | - | - | 6 | 3 | 4 | 5 | - | - | 1 | - | - | - | - | - | - | 1 | - |
| Slave5_B | 69 | 70 | 68 | 66 | 68 | - | - | 6 | 2 | 3 | 4 | - | - | - | 1 | - | - | - | - | 1 | - | - |
| Slave6_B | 70 | 192 | 69 | 66 | 68 | - | - | 6 | 1 | - | 3 | - | 1 | - | - | - | - | - | 2 | - | - | - |

FIG. 20

| | My_SN | p0_SN | p1_SN | p0_LNM | p1_LNM | RNMp | RNMs | node_cnt | p0_hop Manager_A | Slave1_A | Slave2_A | Slave3_A | Slave4_A | Slave5_A | Slave6_A | p1_hop Manager_A | Slave1_A | Slave2_A | Slave3_A | Slave4_A | Slave5_A | Slave6_A |
|---|---|---|---|---|---|---|---|---|---|---|---|---|---|---|---|---|---|---|---|---|---|---|
| Manager_A | 128 | 1 | 6 | 1 | 5 | - | - | 4 | - | 1 | - | - | - | 2 | 1 | - | - | - | - | - | - | - |
| Slave1_A | 1 | - | 128 | - | 5 | - | - | 4 | - | - | - | - | - | 3 | 2 | - | - | - | - | - | - | - |
| Slave2_A | 2 | 3 | - | 4 | 2 | - | - | 3 | - | - | - | 1 | 2 | - | - | - | - | - | - | - | - | - |
| Slave3_A | 3 | 4 | - | 4 | 2 | - | - | 3 | - | - | 1 | - | - | - | - | - | - | - | - | - | - | - |
| Slave4_A | 4 | - | 2 | 4 | 2 | - | - | 3 | - | - | 2 | - | - | - | - | - | - | - | 1 | - | - | - |
| Slave5_A | 5 | 6 | - | 1 | 5 | - | - | 4 | 2 | - | - | - | - | - | 3 | - | - | - | - | - | - | - |
| Slave6_A | 6 | 128 | 5 | 1 | 5 | - | - | 4 | 1 | - | - | - | - | - | - | - | - | - | - | - | 1 | - |

| | My_SN | p0_SN | p1_SN | p0_LNM | p1_LNM | RNMp | RNMs | node_cnt | p0_hop Manager_B | Slave1_B | Slave2_B | Slave3_B | Slave4_B | Slave5_B | Slave6_B | p1_hop Manager_B | Slave1_B | Slave2_B | Slave3_B | Slave4_B | Slave5_B | Slave6_B |
|---|---|---|---|---|---|---|---|---|---|---|---|---|---|---|---|---|---|---|---|---|---|---|
| Manager_B | 192 | 65 | 70 | 66 | 68 | - | - | 6 | - | 1 | 2 | - | 3 | 4 | - | - | - | - | - | - | - | 1 |
| Slave1_B | 65 | 66 | 192 | 66 | 68 | - | - | 6 | - | - | 2 | 3 | 4 | 5 | - | 3 | 2 | - | - | - | - | - |
| Slave2_B | 66 | - | 65 | 66 | 68 | - | - | 6 | - | - | - | - | 4 | 5 | - | 4 | 3 | - | - | - | - | 2 |
| Slave3_B | 67 | - | - | - | - | - | - | 1 | - | - | - | - | - | - | - | 5 | 4 | - | - | - | - | 3 |
| Slave4_B | 68 | 69 | 66 | 66 | 68 | - | - | 6 | 3 | - | - | - | - | 1 | 2 | - | - | - | - | - | - | - |
| Slave5_B | 69 | 70 | 68 | 66 | 68 | - | - | 6 | 2 | - | - | - | 1 | - | - | - | - | - | - | - | - | - |
| Slave6_B | 70 | 192 | 69 | 66 | 68 | - | - | 6 | 1 | - | - | - | 2 | - | - | - | - | - | - | - | - | - |

| | My_SN | p0_SN | p1_SN | p0_LNM | p1_LNM | RNMp | RNMs | node_cnt | p0_hop Mana-ger_B | Slave1_B | Slave2_B | Slave3_A | Slave4_B | Slave5_B | Slave6_B | Mana-ger_B | Slave1_B | Slave2_B | Slave3_A | Slave4_B | Slave5_B | Slave6_B | p1_hop Slave1_B | Slave2_B | Slave3_A | Slave4_A | Slave5_B | Slave6_B |
|---|---|---|---|---|---|---|---|---|---|---|---|---|---|---|---|---|---|---|---|---|---|---|---|---|---|---|---|---|

| | My_SN | p0_SN | p1_SN | p0_LNM | p1_LNM | RNMp | RNMs | node_cnt | Mana-ger_B | Slave1_B | Slave2_B | Slave3_A | Slave4_B | Slave5_B | Slave6_B | Mana-ger_B | Slave1_B | Slave2_B | Slave3_A | Slave4_A | Slave5_B | Slave6_B |
|---|---|---|---|---|---|---|---|---|---|---|---|---|---|---|---|---|---|---|---|---|---|---|
| Manager_B | 192 | 65 | 70 | - | - | 192 | 70 | 9 | 9 | 8 | 7 | 6 | 5 | 4 | 3 | 2 | 1 | 9 | 8 | 7 | 6 | 5 |
| Slave1_B | 65 | 66 | 192 | - | - | 192 | 70 | 9 | 9 | 8 | 7 | 6 | 5 | 4 | 3 | 2 | 1 | 9 | 8 | 7 | 6 | 5 |
| Slave2_B | 66 | 2 | 65 | - | - | 192 | 70 | 9 | 7 | 8 | 9 | 1 | 2 | 3 | 4 | 5 | 6 | 8 | 9 | 1 | 2 | 3 |
| Slave3_A | 2 | 3 | 66 | - | - | 192 | 70 | 9 | 6 | 7 | 8 | 9 | 1 | 2 | 3 | 4 | 5 | 7 | 8 | 9 | 1 | 2 |
| Slave4_A | 3 | 4 | 3 | - | - | 192 | 70 | 9 | 5 | 6 | 7 | 8 | 9 | 1 | 2 | 3 | 4 | 6 | 7 | 8 | 9 | 1 |
| Slave4_B | 68 | 69 | 4 | - | - | 192 | 70 | 9 | 4 | 5 | 6 | 7 | 8 | 9 | 1 | 2 | 3 | 5 | 6 | 7 | 8 | 9 |
| Slave5_B | 69 | 70 | 68 | - | - | 192 | 70 | 9 | 3 | 4 | 5 | 6 | 7 | 8 | 9 | 1 | 2 | 4 | 5 | 6 | 7 | 8 |
| Slave6_B | 70 | 192 | 69 | - | - | 192 | 70 | 9 | 2 | 3 | 4 | 5 | 6 | 7 | 8 | 9 | 1 | 3 | 4 | 5 | 6 | 7 |

ADAPTIVE MULTI-REDUNDANT RING NETWORK SYSTEM AND METHOD FOR SELECTING DETOUR

CROSS-REFERENCE TO RELATED APPLICATIONS

Pursuant to 35 U.S.C. §119(a), this application claims the benefit of earlier filing date and right of priority to Korean Patent Application No. 10-2011-0005928, filed on Jan. 20, 2011, the contents of which are hereby incorporated by reference herein in its entirety.

FIELD OF THE DISCLOSURE

The present invention relates generally to a network system and, more particularly, to an adaptive multi-redundant ring network system with redundant extended bases.

DISCUSSION OF THE RELATED ART

Conventional automated equipment used in industrial settings comprises mechanical equipment using a relay and other devices. In order to functionally change the automated equipment comprising the mechanical equipment, there is a difficulty in correcting wires of an internal circuit of the equipment one by one. In order to solve the problem, a programmable logic controller (hereinafter referred to as a PLC) has been proposed.

The PLC is the programmable logic controller. The PLC usually performs a role same as that of a computer, and is configured to receive a signal from the equipment, process the signal according to contents programmed therein, and then output the processed signal to the equipment. Further, the PLC functionally substitutes a control unit such as a relay, a timer, and a counter with a semiconductor device such as an integrated device or a transistor. The PLC includes a basic sequence control function added by a numeric calculating function to control a program, and executes a predetermined logic according to a program previously stored in an internal memory. The PLC may be used for various operations, for example, a device control operation, a numeric setting operation, a time control operation, a real-time monitoring operation, a real-time data collecting operation, and a safety-device running operation.

Today, a PLC system using the PLC has been widely used in a variety of fields, including a dam, a power plant, a semiconductor manufacturer, etc. The PLC system is used to process industrially important data, for example, data for a key industry such as power production facilities. In this case, if the PLC system is erroneous in operation, an enormous expense is incurred. Thus, stability of the system is very important. When data is erased or an error occurs in operation because of an error in the PLC system, an enormous expense may be incurred. In order to solve the problem, the PLC system uses a redundant technique of duplicating functional blocks performing the same function.

Generally, the redundant PLC system is provided with two central process units (hereinafter referred to as CPUs) to prepare for the worst. However, the redundant technique is not applied to each base for really executing a predetermined operation of the PLC system, resulting in reduced operational effect, even though two CPUs are provided.

As an available range of a PLC is expanded by continuous increase in factory automation, the PLC has been used in various fields. Among them, a redundant system has been used in a plant in which a system must be continuously operated without a stop. The redundant system includes a master system that acts as a main system, and a standby system that is ready to operate without a stop when the main system has a fault. The redundant system is generally configured to duplicate only CPUs and power units. In this case, an extended base is not duplicated, thus resulting in a stop of an associated base when the extended base has a fault.

SUMMARY OF THE DISCLOSURE

Accordingly, an object of the present invention is to provide an adaptive multi-redundant ring network system using a 2 port Ethernet communication module capable of selecting a path.

Another object of the present invention is to provide a method for selecting a detour that is created by mixing two paths with each other.

In order to accomplish the above objects, there is provided an adaptive multi-redundant ring network system comprising a main network system and a sub-network system. The main network system includes a first main control unit and a plurality of first slaves, and the sub-network system includes a second main control unit and a plurality of second slaves. Each of the plurality of first slaves and each of the plurality of second slaves include 2-port Ethernet communication modules, and each of the plurality of first slaves, each of the plurality of second slaves, the first slave and the second slave are selectively connected via the 2-port Ethernet communication modules.

Preferably, depending on a connection state of the 2-port Ethernet communication modules, the multi-redundant ring network system forms a first path connected with the first main control unit and the plurality of first slaves, a second path connected with the second main control unit and the plurality of second slaves, a third path connected with the first main control unit, at least two first slaves and at least two second slaves; and a fourth path connected with the second main control unit, at least two first slaves and at least two second slaves.

Preferably, the system performs communication by priority using the first path or the second path, and performs communication using the third path or the fourth path when the first path and the second path may not be used.

Preferably, the 2-port Ethernet communication modules share network information with another communication module connected thereto, and each communication module forms a routing table based on the network information.

Preferably, the 2-port Ethernet communication modules update all information of currently connected network when disconnection is made between communication modules, and correct the routing table.

In order to accomplish the above objects, there is provided a method for selecting a detour of an adaptive multi-redundant ring network system including a main network system having a first main control unit and a plurality of first slaves, and a sub-network system having a second main control unit and a plurality of second slaves, the method comprising steps of determining whether a first path connected with the first main control unit and the plurality of first slaves is connected; determining whether to use a second path connected with the second main control unit and the plurality of second slaves, when it is determined that the first path is disconnected; using the second path as a communication network when the second path is normally connected; and using either of a third path or a fourth path as the communication network when it is determined that the second path is disconnected, the third path being connected with the first main control unit, at least two first slaves and at least two second slaves, the fourth path being connected with the second main control unit, at least two first slaves and at least two second slaves.

Preferably, The method further comprises forming the first path connected with the first main control unit and the plurality of first slaves; the second path connected with the second main control unit and the plurality of second slaves; the third path connected with the first main control unit, at least two first slaves and at least two second slaves; and the fourth path connected with the second main control unit, at least two first slaves and at least two second slaves.

BRIEF DESCRIPTION OF THE DRAWINGS

FIG. 9 is a diagram illustrating a routing table of the system shown in FIG. 8;

FIG. 11 is a diagram illustrating a routing table in the case of FIG. 10;

FIG. 13 is a diagram illustrating a routing table in the case of FIG. 12;

FIG. 15 is a diagram illustrating a routing table in the case of FIG. 14;

FIG. 17 is a diagram illustrating a routing table of FIG. 16;

FIG. 20 is a diagram illustrating a routing table of FIG. 18.

DETAILED DESCRIPTION OF PREFERRED EMBODIMENTS

Figure 1:
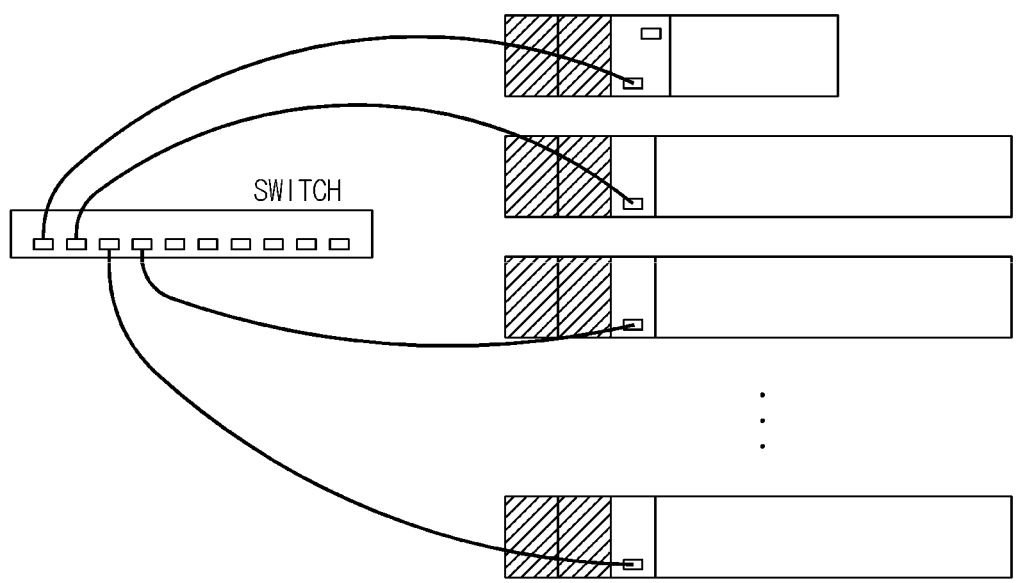
FIG. 1 is a diagram illustrating a network control system using industrial Ethernet.

Since the present invention may be variously changed and include several embodiments, particular embodiments shown in the drawings will be described in detail in the detailed description.

However, it is to be understood that the invention is not limited to the particular embodiments, and various changes, equivalences and substitutions may be made without departing from the scope and spirit of the invention.

Although the terms "first", "second", etc. are used herein to describe various components, these components should not be limited by these terms.

These terms are only used to distinguish one component from another component. For example, the second component may be designated as the first component without departing from the scope of the invention. Similarly, the first component may be designated as the second component.

Further, when the term "couple" or "connect" is used in the specification or claims, it is intended to mean not only "directly coupled or connected to" but also "indirectly coupled or connected to" such as connected through another component or components. In contrast, the term "directly coupled or connected" means that there is no component between the coupled or connected components.

Also, it is to be understood that terms employed herein are for the purpose of description of particular embodiments and not of limitation. Further, the singular forms "a" and "an" include plural referents unless the context clearly dictates otherwise.

Furthermore, it should be understood that terms "include" or "have" are inclusive of characteristics, numerals, steps, operations, components, parts or combination thereof, which are described herein, but are not exclusive of one or more different characteristics, numerals, steps, operations, components, parts or combination thereof.

For convenience of explanation, the size of components shown in the drawings may be expanded or reduced.

Hereinafter, the present invention will be described in detail with reference to the accompanying drawings, and the same reference numerals will be used to refer to the same components throughout the specification, and a duplicated description thereof will be omitted.

The present invention is directed to a redundant PLC system using duplication of cables and extended driver modules for controlling extended bases based on Ethernet.

Further, the present invention relates to a redundant PLC system and, more particularly, to a duplication method for individual operation of an extended base control module in an existing redundant PLC system.

Particularly, duplication of CPUs and power units leads to an increase in availability of a system, because the system is switched and operated without a stop when one CPU or power unit fails.

In the case of concentrating duplication on an extended system, an associated base and a mounted module may stop if an extended control module has a fault, because the module controlling the extended base is individually operated. However, an entire system does not stop operating but only the associated base stops operating, because of a configuration of a redundant system. Unless the faulty base affects the entire system, there is no problem. However, if the faulty base functions to control an important part, the system must be consequently stopped and replaced with another one.

Thus, if the extension control module is configured to have a redundant structure, a system is switched to another standby module when one module has a fault, thus enabling continuous operation without delay. Therefore, downtime of the system is eliminated or an economic loss is prevented.

The present invention relates to a method for forming a ring detour when a ring network system has multiple failures, thus increasing availability.

FIG. 1 is a diagram illustrating a network control system using industrial Ethernet.

Referring to FIG. 1, a network control system developed with the advent of the industrial Ethernet controls respective control units via the Ethernet. In this case, the control units must be connected using switches. Thus, since the switches as well as the control units are additionally required and all wires are connected to the switches, it is impossible to control the entire system when the switches fail.

Figure 2:
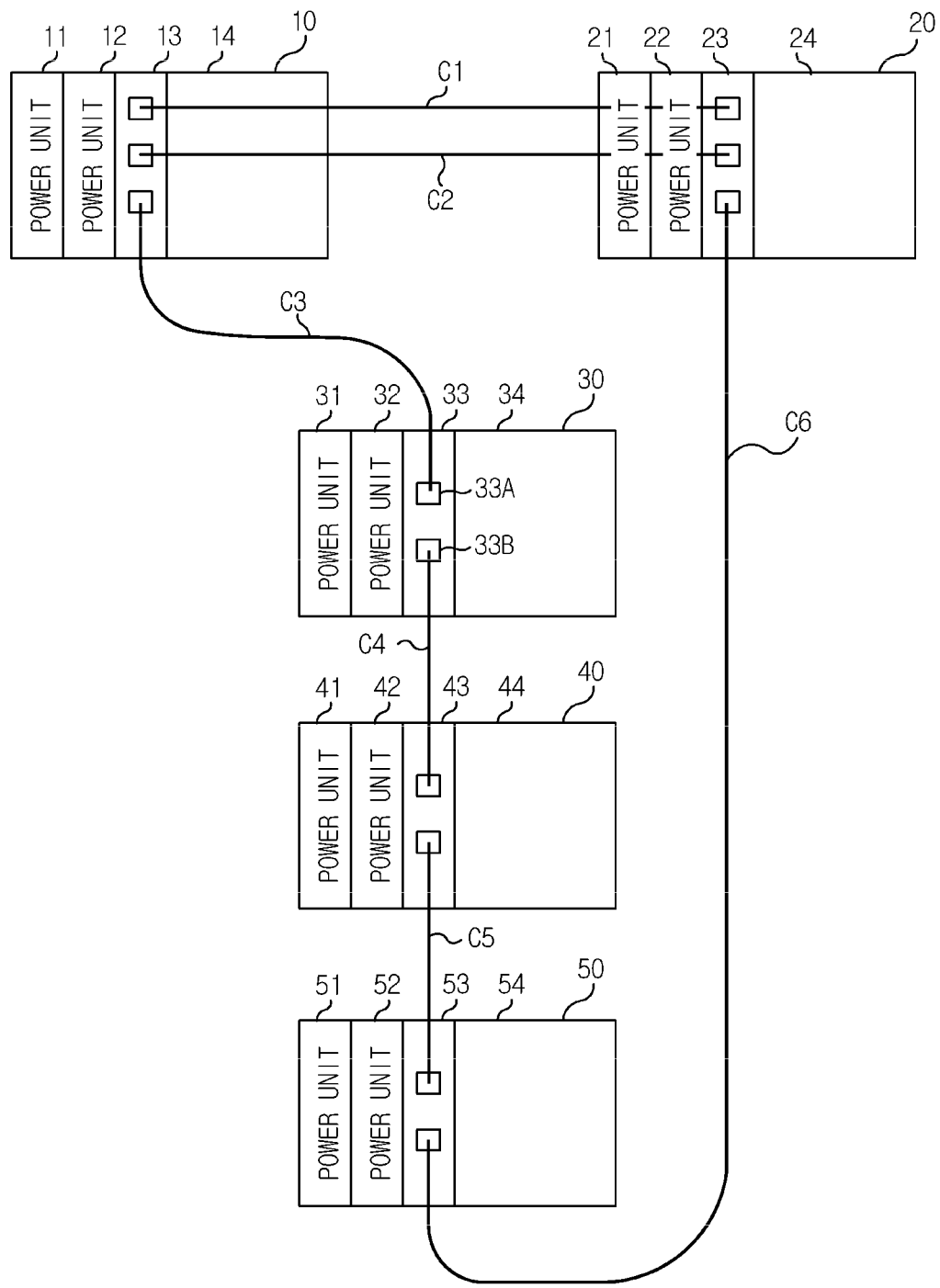
FIG. 2 is a block diagram illustrating a network control system using a redundant PLC.

FIG. 2 is a block diagram illustrating a network control system using a redundant PLC. Herein, it is considered that a PLC system has the same meaning as a network system.

As shown in FIG. 2, the PLC system includes a first main base 10, a second main base 20, a first extended base 30, a second extended base 40, and a third extended base 50. In the drawing, three bases are shown. However, the PLC system may be provided with a plurality of bases, namely, three or more bases if necessary.

The first main base 10 includes a calculation unit (not shown) and power units 11 and 12. Similarly, the second main base 20 also includes a calculation unit (not shown) and power units 21 and 22.

The first extended base 30 includes power units 31 and 32, a first extended driver module 33 and a first module unit 34. The first module unit 34 is an area in which each module performing a function required for the extended base is placed. The first extended driver module 33 includes a first data transceiving unit 33A and a second data transceiving unit 33B. A second extended base 40 and a third extended base 50 have the same configuration as the first extended base 30.

Generally, as shown in FIG. 1, the PLC system configured so that one main base and a plurality of extended bases are provided and all the bases are connected to each other is referred to as an extended base PLC system. Each base includes a plurality of modules having required functions.

The redundant system can continue a required operation without stopping calculation even if any one unit of the system fails. There are various redundant PLC systems using duplication of CPUs, powers, or bases. A main-base redundant system is configured so that two main bases include CPUs, respectively. Thereby, when one main base fails, calculation is continuously executed by the remaining main base. Meanwhile, a power redundant system is configured to have two power modules. Further, a base redundant system is configured so that the same module is mounted to each of two bases. Thereby, when one base has a fault, calculation is executed by the PLC having the remaining base.

If the base includes two power units and the power units are connected to each other in parallel, the base can maintain its operation even when one power unit has a fault, because the remaining power unit continues to supply power.

FIG. 2 shows a control method using a 2 port Ethernet, wherein a communication module has a switch function. Such a configuration does not use a switch, thus increasing safety and reducing costs for equipment and wiring. Recently, such a system is widely used in industrial settings. Since the system has a ring shape to implement a redundant network system, a control operation may be normally performed via a detour even if any of networks has a fault.

Figure 3:
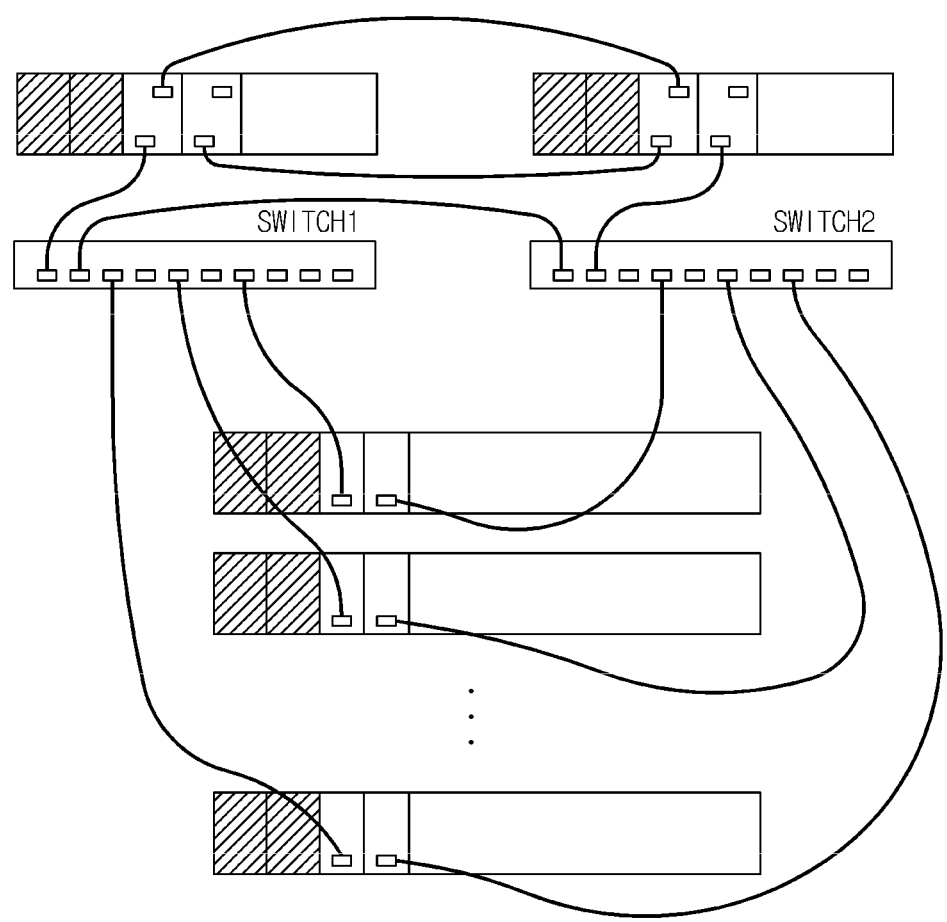
FIG. 3 is a diagram illustrating an embodiment of a redundant network system using a wire and a switch.

FIG. 3 is a diagram illustrating an embodiment of a redundant network system using a wire and a switch.

Figure 4:
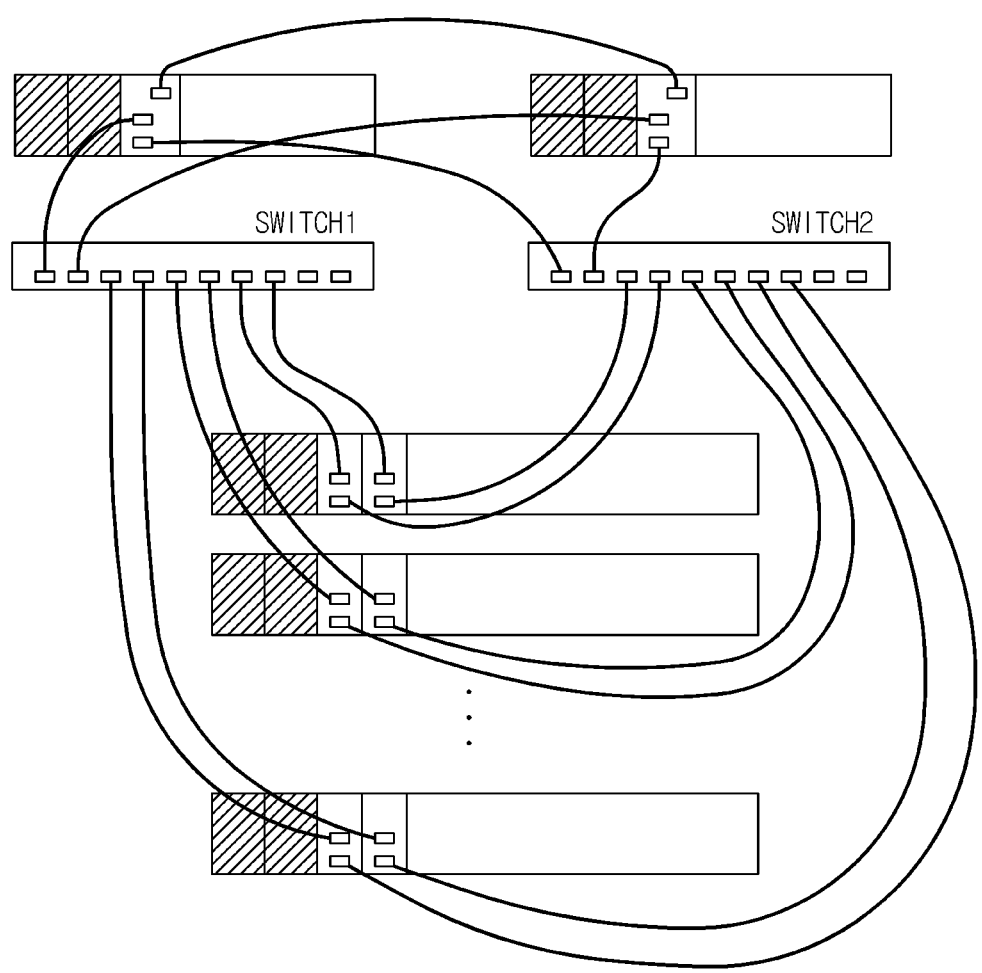
FIG. 4 is a diagram illustrating another embodiment of a redundant network system using a wire and a switch.

FIG. 4 is a diagram illustrating another embodiment of a redundant network system using a wire and a switch.

The systems shown in FIGS. 3 and 4 improve the system of FIG. 1, and are intended to increase availability in spite of an increase in cost for a switch, an additional communication module, and a wire.

Figure 5:
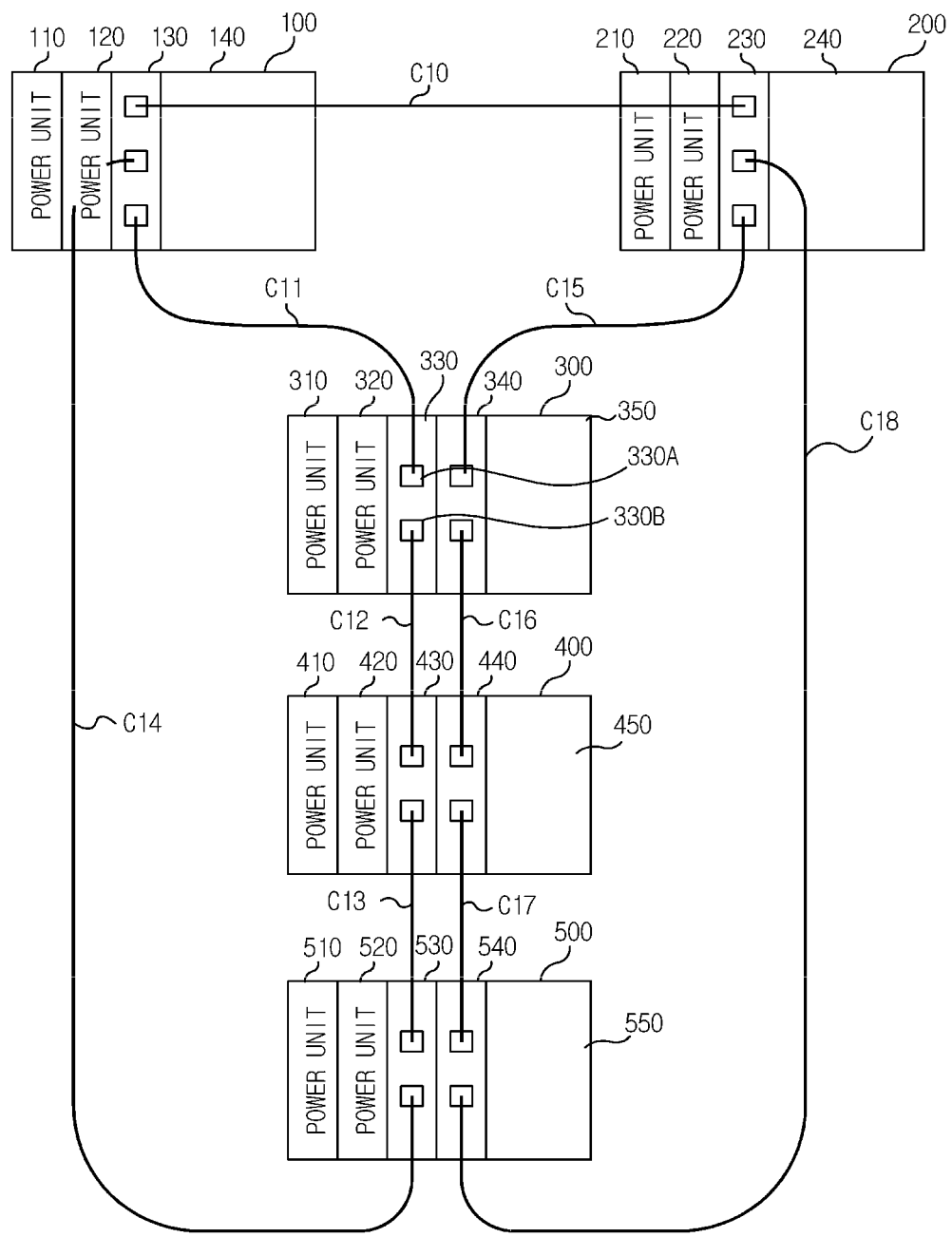
FIG. 5 is a diagram illustrating an embodiment of a redundant ring network system having no switch.

FIG. 5 is a diagram illustrating an embodiment of a redundant ring network system having no switch.

Figure 6:
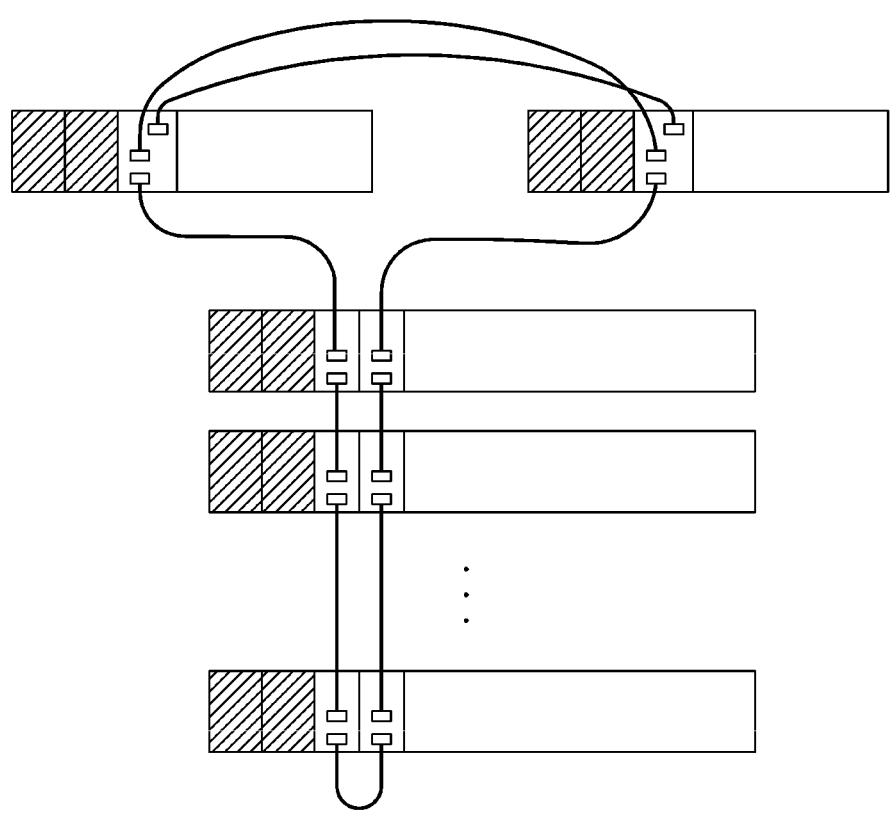
FIG. 6 is a diagram illustrating another embodiment of a redundant ring network system having no switch.

FIG. 6 is a diagram illustrating another embodiment of a redundant ring network system having no switch.

Referring to FIG. 5, the PLC system includes a first main base 100, a second main base 200, a first extended base 300, a second extended base 400 and a third extended base 500.

The first main base 100 includes a calculation unit (not shown) and power units 110 and 120. Similarly, the second main base 200 includes a calculation unit (not shown) and power units 210 and 220.

For the purpose of redundancy, the main base is composed of two bases, namely, a master base that is the first main base 100 and a standby base that is the second main base 200. The two main bases 100 and 200 share data using a cable C10 for duplication. Each of the two main bases 100 and 200 requires power, a CPU module for duplication, communication and I/O modules, respectively. The modules of the two main bases have the same configuration. Further, for the duplication of power, the two main bases 100 and 200 are equipped with two power units 110 and 120, and 210 and 220, which are in the form of modules. Further, the CPU modules (not shown) provided on the main bases 100 and 200 for connection with the first, second, and third extended bases 300, 400 and 500 include Ethernet ports for the connection with the extended bases.

The first extended base 300 includes power units 310 and 320, a first extended driver module 330, a second extended driver module 340 and a module unit 350. The first extended driver module 330 includes a first data transceiving unit 330A and a second data transceiving unit 330B. The second extended driver module 340 includes a third data transceiving unit 340A and a fourth data transceiving unit 340B. The second extended base 400 and the third extended base 500 have the same configuration as the first extended base 300. The module unit 350 has a plurality of modules in the base. Since the second extended base 400 and the third extended base 500 have the same configuration as the first extended base 300, a detailed description will be omitted herein.

Each of the three extended bases 300, 400 and 500 includes a power module, an extended driver module (e.g. 330, 340) for controlling the extended base, communication and I/O modules. The extended driver module 330 includes an Ethernet port that is a data transceiving unit 300A for transceiving data with the main base 100, and an Ethernet port that is a data transceiving unit 300B for transmitting data to another extended base. Cables C11 to C14 connect the first extended driver modules 330, 430 and 530 of the three extended bases 300, 400 and 500 to the first main base 100, while cables C15 to C18 connect the second extended driver modules 340, 440 and 540 of the respective extended bases to the second main base 200.

As described above, this embodiment is characterized in that each extended base includes two extended driver modules.

The first extended base 300 includes the first extended driver module 330 and the second extended driver module 340. The extended driver modules have a function of controlling an operation of each module provided in the base, and a function of performing Ethernet communication. In order to enable the duplication of the extended driver module, the two extended driver modules periodically share data with each other to have the same data.

The PLC system shown in FIG. 5 includes a first system and a second system. The first system includes the first main base 100, the first extended driver module 330 of the first extended base 300, the first extended driver module 430 of the second extended base 400, and the first extended driver module 530 of the third extended base 500. The second system includes the second main base 200, the second extended driver module 340 of the first extended base 300, the second extended driver module 440 of the second extended base 400, and the second extended driver module 540 of the third extended base 500.

The CPU module provided in the first main base 100 that is the master base actually executes calculation. The CPU module provided in the second main base 200 that is the standby base has the same information as the CPU module of the first main base 100, but does not actually execute calculation. The second main base 200 that is the standby base is switched to the master base to execute calculation when the CPU module of the first main base 100 that is the master base fails or malfunctions.

The CPU module of the first main base 100 gives a command to the extended driver module provided in each extended base, and receives data. Each extended driver module transmits the command from the CPU module to the communication and I/O modules provided in the extended base, and transmits data from the communication and I/O modules to the CPU module.

As shown in FIG. 5, when a redundant extended driver module PLC system is configured by mounting two extended driver modules on the extended base, even if one extended driver module has a fault, the system can continue to operate without a stop using the remaining extended driver module. Further, the duplication of the extended driver modules realizes duplication of extended cables.

It is possible to construct two ring extended network systems, namely, an extended ring network for a first main base system and an extended ring network for a second main base system, using the extended cable C14 provided on one side of FIG. 5 and the extended cable C18 provided on the other side. As a result, this enables network duplication of the extended bases as well as the main bases having two CPUs, thus increasing reliability of the redundant extended PLC system.

Both the main base and the extended base of the extended PLC system according to this embodiment are equipped with two or more power modules for power duplication. When one power module fails, the remaining power module can perform a function.

The systems shown in FIGS. 5 and 6 improve the configuration of the system shown in FIG. 2, and increase availability by using two 2-port Ethernet modules without using a switch. Although the systems do not use a switch and reduce a wiring cost, they have the same availability as that of the system using the switch. The systems have the same availability as the system using two switches as for a control object, and have slightly lower availability than the system using two switches as for a network cable.

As shown in FIG. 5, the configuration using two 2-port Ethernet communication modules without using a switch has the same availability as the system using two switches, as for a control object. Here, the availability may be considered as the number of communication ports of the control object.

However, as for an entire network instead of the control object, the system (see FIG. 4) reduplicating switches by adding the number of communication ports thereof has higher availability. Thus, in the case of the system that does not use the switch, it can provide higher availability, as for the control object. In contrast, the system using the switch has higher availability, as for the entire network. Here, the availability may be considered as the number of Ethernet ports of the system.

The present invention pertains to a method for selecting a ring detour when multiple failures occur in a redundant ring network system configured using a 2-port Ethernet communication module having a switch function, and enhances the availability of the system.

Figure 7:
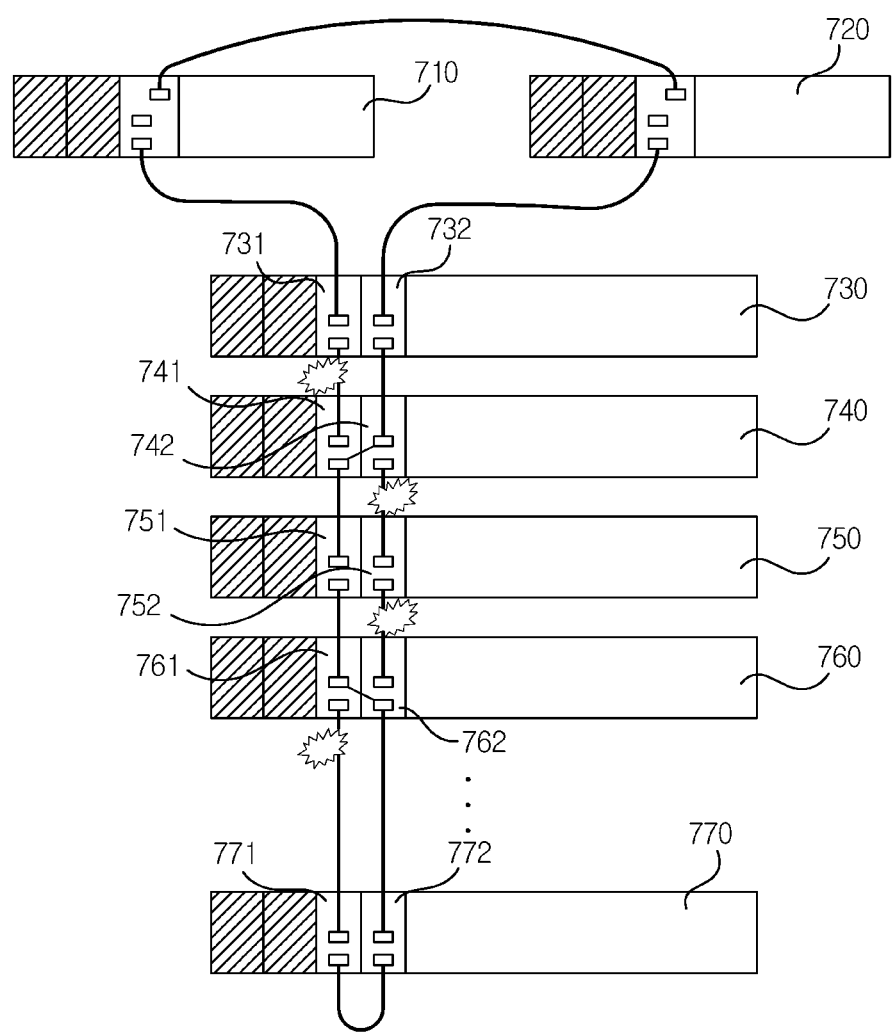
FIG. 7 is a diagram illustrating a multi-redundant ring network system in accordance with an embodiment of the present invention.

FIG. 7 is a diagram illustrating a multi-redundant ring network system in accordance with an embodiment of the present invention.

As shown in FIG. 7, the multi-redundant ring network system according to the embodiment of the present invention includes two 2-port switching Ethernet communication modules installed in a controller and a network cable. The 2-port switching Ethernet communication modules find a connectable path and form a ring to enable communication when multiple failures occur in the redundant ring network system.

The multi-redundant ring network system according to the present invention shown in FIG. 7 includes four paths that will be described below. The paths used in the following description have the same meaning as ring-shaped closed-loops.

The first path is formed by connecting a first main control unit 710 and a plurality of first slaves 731, 741, 751, 761 and 771.

The second path is formed by connecting a second main control unit 720 and a plurality of second slaves 732, 742, 752, 762 and 772.

The third path is formed by connecting the first main control unit 710, at least two first slaves and at least two second slaves.

The fourth path is formed by connecting the second main control unit 720, at least two first slaves and at least two second slaves.

Generally, communication is performed using the first path. If the first path has a fault, the second path is used.

However, if the second path has a fault too, communication was impossible in the conventional system. In order to solve the problem, according to the present invention, communication may be performed by the third path and the fourth path.

According to the present invention, as shown in FIG. 7, since both the first and second paths have faults, they cannot be used. However, if it is possible to use a detour except portions in which faults occur in the first and second paths, namely, the third path or the fourth path, the system can continue operating without a stop.

Referring to FIG. 7, since it is possible to use the fourth path formed by the second main control unit 720, at least two first slaves 741, 751 and 761 and the second slaves 732, 742, 762 and 772, the system can continue operating.

When the extended base has a fault and thus connection is disconnected, the network system shown in FIG. 7 restores the disconnected network, so that the system continues operating without a stop. Further, a ring configuration is formed, so that the system can continue operating even if a fault occurs in one network.

Referring to FIG. 7, when the network system is disconnected by a fault of the extended base, the first system including the first extended driver modules of the respective extended bases and the second system including the second extended driver modules of the respective extended bases are connected to each other if possible, thus forming the ring configuration, thereby allowing the system to maintain its operation. That is, the important feature of the present invention is that the system of FIG. 7 has the 2-port switching Ethernet communication modules on the extended bases.

Hereinafter, an operation of the multi-redundant ring network system according to the present invention will be described.

First, in the multi-redundant ring network system according to the present invention, it is assumed that industrial Ethernet is a dual ring network system. The dual ring network structure is a redundant network that provides a detour for one network fault. When the network has the fault, it is determined whether an adjacent communication module or a master communication module has a fault, thus transmitting data along the detour.

Second, the system of the present invention is configured so that two communication modules are mounted to each control object, and two communication modules for performing a control operation are provided.

Third, a communication module mounted to each control object is aware of all network information about a connected communication module, and each communication module forms a routing table with reference to the network information, thus transmitting data along an optimum path.

Fourth, when connection between communication modules mounted to respective control objects is disconnected, information of all networks currently connected to the communication modules is updated, and a routing table is corrected.

Fifth, the network information is shared by a channel connected between two communication modules mounted to the same control object. A PLC uses a signal line of a base equipped with a communication module, as a connection channel.

Sixth, as in the case where connection with a communication module performing a control operation is disconnected, if a failure occurs in a network while it normally performs communication, connection with a communication module involved in a current control operation is checked based on network information of an opponent communication module, and a routing table is reset, thus forming a connectable ring network.

A series of steps of resetting the routing table of the network system will be described below with reference to FIGS. 8 to 20.

The set state and abbreviations of the network system used in the following description are as follows.

First, exchange numbers of SlaveN_A and SlaveN_B are set by adding offset of the maximum exchange number. For easy understanding of the invention, the offset assumes 64.

Manager_A and Manager_B are set to numbers that may not be set in the exchange number of the Slave, and are set to numbers 128 and 192 in the case of the above example.

The term "Hop count" denotes a node distance on the network.

p0 and p1 mean Ethernet ports installed in respective modules, and denote a lower port and an upper port, respectively.

Line Network Manager (LNM) denotes node exchange numbers at opposite ends when topology takes a shape of a line.

RNMP and RNMS function to prevent congestion of a packet due to infinite relay when the packet is transmitted to a ring network manager on ring topology. The RNMP does not transmit the packet to the RNMS, and the RNMS does not transmit the packet to the RNMP.

Figure 8:
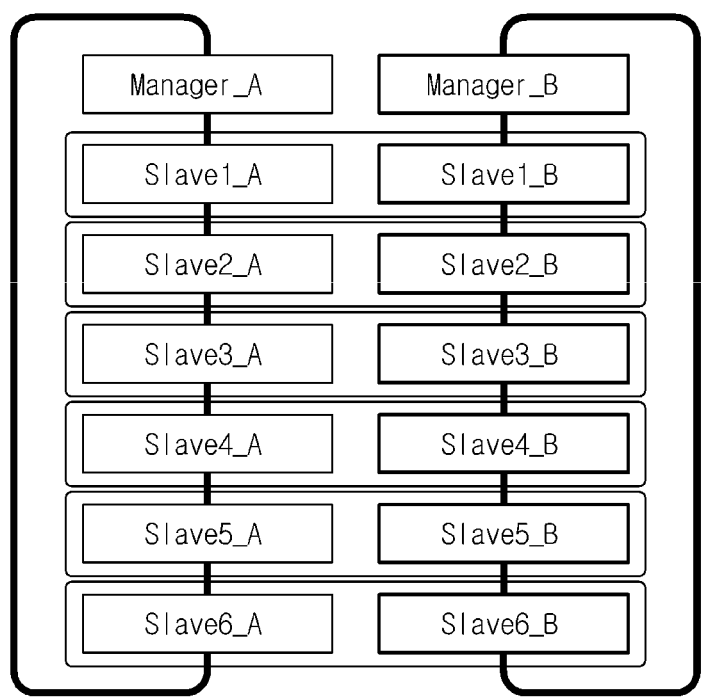
FIG. 8 is a diagram illustrating a redundant ring network system in a normal state.

FIG. 8 is a diagram illustrating a redundant ring network system in a normal condition.

Referring to FIG. 8, in the normal condition, the redundant ring network system has a main network on the left and a sub-network on the right, and transmits control information to the main network to operate the system.

FIG. 9 is a diagram illustrating a routing table of the system shown in FIG. 8.

Referring to numerals of the routing table of the main network shown in FIG. 9, Manager_A transmits data to Slave1_A, Slave2_A and Slave3_A through the port P0 and transmits data to Slave4_A, Slave5_A and Slave6_A through the port P1.

Figure 10:
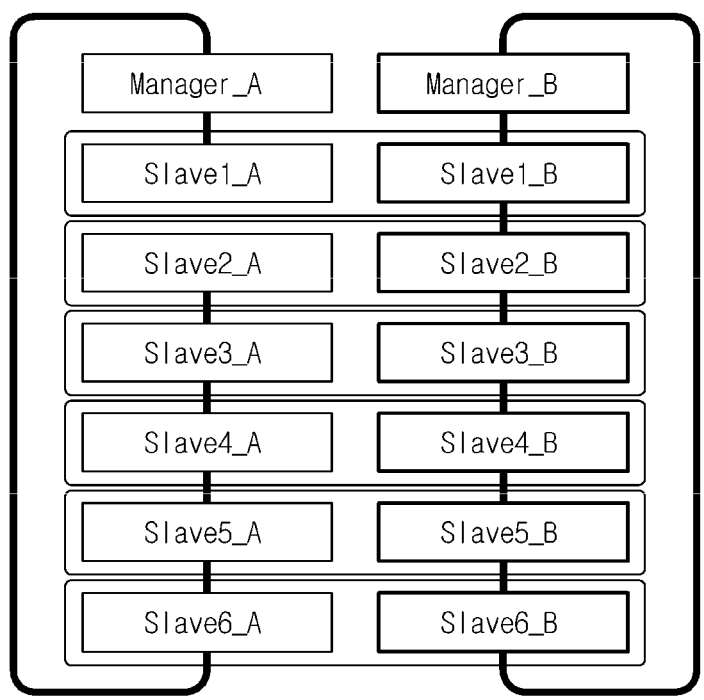
FIG. 10 is a diagram illustrating a case where one fault occurs in a main network of FIG. 8.

FIG. 10 is a diagram illustrating a case in which one fault occurs in the main network of FIG. 8.

Referring to FIG. 10, the fault occurs between Slave1_A and Slave2_A in the main network. In this case, since communication with all Slaves is possible, a switch to the sub-network is not required.

FIG. 11 is a diagram showing a routing table in the case of FIG. 10.

Referring to FIG. 11, Manager_A transmits control information to Slave1_A through the port P0 and transmits control information to Slave2_A, Slave3_A, Slave4_A, Slave5_A, and Slave6_A through the port P1.

Figure 12:
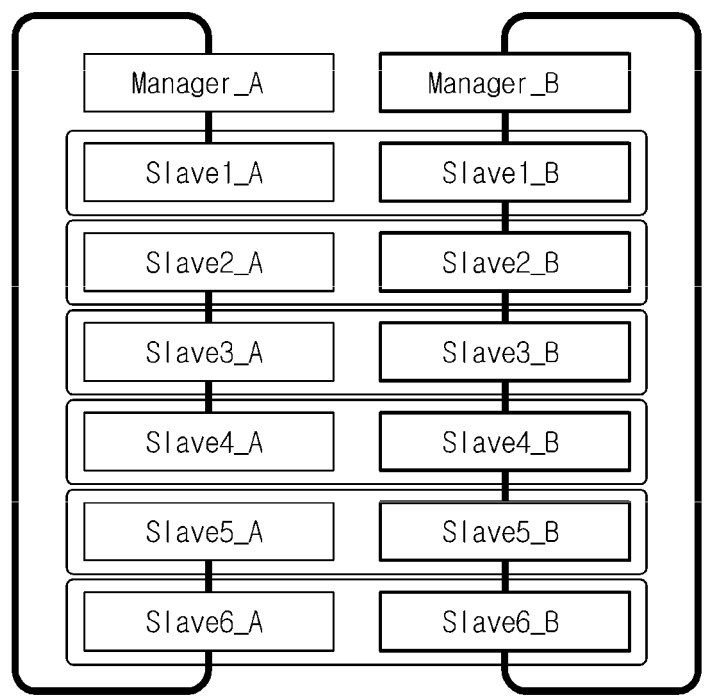
FIG. 12 is a diagram illustrating a case where two faults occur in the main network of FIG. 8.

FIG. 12 is a diagram illustrating a case in which two faults occur in the main network of FIG. 8.

Referring to FIG. 12, the faults occur between Slave1_A and Slave2_A and between Slave4_A and Slave5_A in the main network. In this case, since communication with all Slaves is impossible, control authority is transferred to the sub-network.

FIG. 13 is a diagram illustrating a routing table in the case of FIG. 12.

Referring to FIG. 13, control information is transmitted using the sub-network. Here, information is transmitted through the same path as the main network of FIG. 8.

Figure 14:
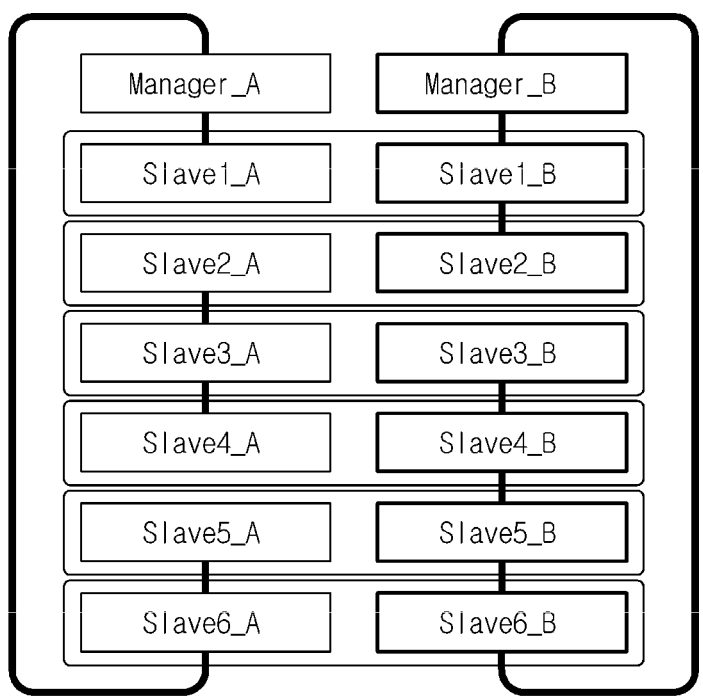
FIG. 14 is a diagram illustrating a case where two faults occur in the main network shown in FIG. 12 and thereafter one fault occurs in a sub-network.

FIG. 14 is a diagram illustrating a case in which two faults occur in the main network of FIG. 12 and thereafter one network fault occurs in the sub-network.

Referring to FIG. 14, a fault occurs between Slave2_B and Slave3_B of the sub-network. In this case, the system is switched to line topology, and Manager_B is connected with all Slaves in the sub-network, so that a control operation is possible.

FIG. 15 is a diagram illustrating a routing table in the case of FIG. 14.

Referring to FIG. 15, Manager_B transmits control information through the port P0 to Slave1_B and Slave2_B, and transmits control information through the port P1 to Slave3_B, Slave4_B, Slave5_B, and Slave6_B, so that the system is operated.

Figure 16:
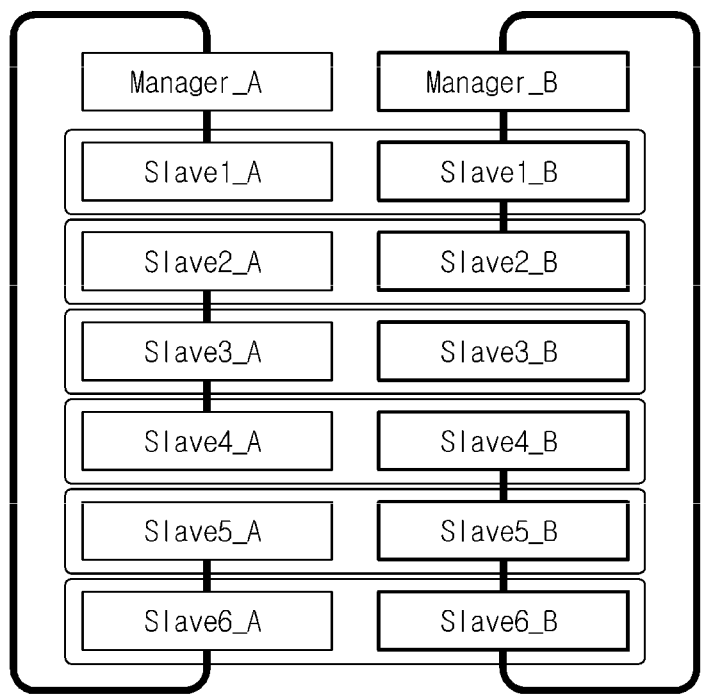
FIG. 16 is a diagram illustrating a case where two faults occur in the main network in FIG. 12 and thereafter two faults occur in the sub-network.

FIG. 16 is a diagram illustrating a case in which two faults occur in the main network of FIG. 12 and thereafter two faults occur in the sub-network.

FIG. 17 is a diagram illustrating a routing table in the case of FIG. 16.

In this case, since Manager_B is not connected with all Slaves, a control operation is impossible.

Figure 18:
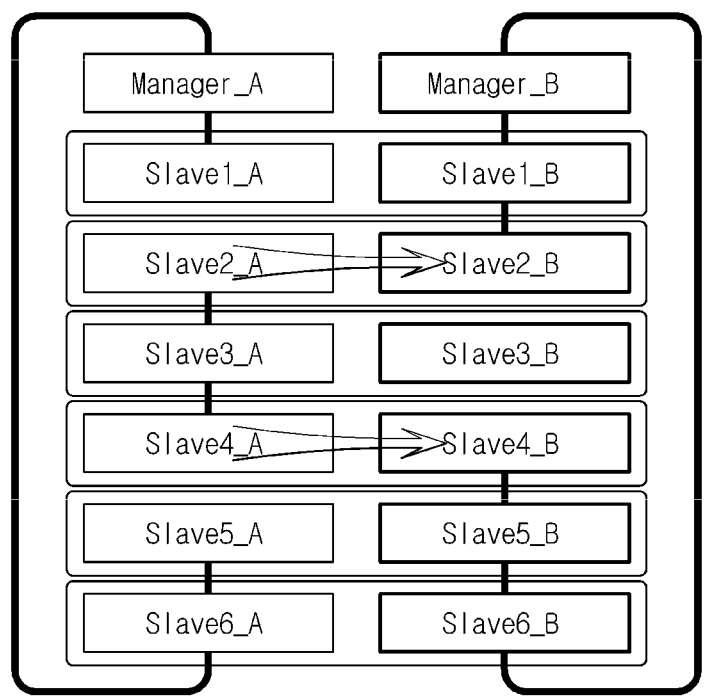
FIG. 18 is a diagram illustrating a process of checking information of the main network in the sub-network, determining whether there is a path for compensating a disconnected portion of the sub-network, and applying the path.

FIG. 18 is a diagram illustrating a process of checking information of the main network in the sub-network, determining whether there is a path for compensating a disconnected portion of the sub-network, and applying the path.

Referring to FIG. 18, in the sub-network, disconnection is made between Slave2_B and Slave4_B. However, in the main network, connection is made between Slave2_A and Slave4_A. Thereby, a path is formed again to enable transmission of control information. In this case, the system is reconfigured so that the lower port of Slave2_B and the upper port of Slave2_A are connected to each other, and the lower port of Slave4_A and the upper port of Slave4_B are connected to each other.

As described above, the multi-path network according to the present invention may largely use four paths. A method for selecting a path from the four paths will be described below.

Figure 19:
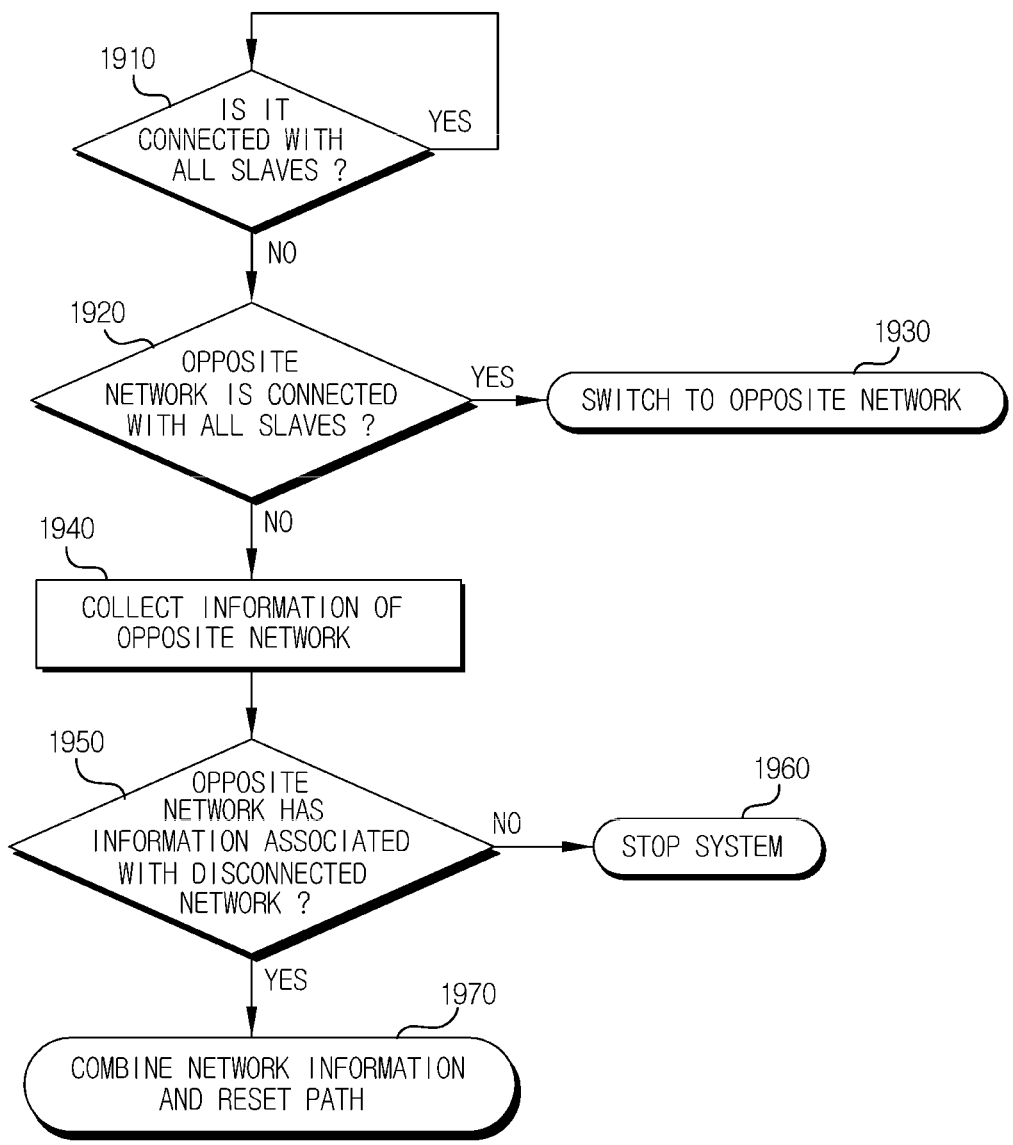
FIG. 19 is a flowchart illustrating a process of selecting a detour.

FIG. 19 is a flowchart illustrating a process of setting a detour.

Referring to FIG. 19, it is determined whether to change a path based on a connection state of all Slaves on a first path that is currently being used, at step 1910. If the path which is currently being used has no fault (i.e. in the case of "YES"), the path is used without a change.

Meanwhile, if the currently used path has a fault (i.e. in the case of "No"), it is determined whether it is possible to use a second path, at step 1920.

If it is possible to use the second path, the second path is selected and used as a new communication path (i.e. a switch to an opposite network is conducted), at step 1930.

If the use of the second path is impossible, for example, at least one of Slaves on the second path is disconnected, the state of the second path is analyzed (i.e. information of the opposite network is collected) at step 1940, and it is determined whether to use a third path or a fourth path at step 1950. That is, it is determined whether the opposite network has information associated with a disconnected network.

When it has been determined that it is possible to use the third path or the fourth path, communication is performed using one of the paths, at step 1970. That is, a path of network information combination is reset.

Further, when it has been determined that it is impossible to use the third path and the fourth path, the system interrupts communication, at step 1960.

FIG. 20 is a diagram illustrating a routing table of FIG. 18.

Referring to FIG. 20, the disconnected path and information of the opposite network are compared to reset a path.

As described above, the network system according to this embodiment is configured in a shape of a dual-ring, and is provided with a path for transmitting data between slaves, thus providing a path capable of transmitting data even if a main network and a sub-network have two faults, respectively. Thus, even in such a case, control information is transmitted to all slaves, so that a network system is normally operated. Therefore, reliability of the system can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An adaptive multi-redundant ring network system comprising:
   a main network system including a first main control unit and a plurality of first slaves; and
   a sub-network system including a second main control unit and a plurality of second slaves, the plurality of second slaves being different than the plurality of first slaves,
   wherein each of the plurality of first slaves and each of the plurality of second slaves include 2-port Ethernet communication modules so as to form:
      a first path connecting the first main control unit and the plurality of first slaves;
      a second path connecting the second main control unit and the plurality of second slaves;
      a third path connecting the first main control unit, at least two first slaves and at least two second slaves; and
      a fourth path connecting the second main control unit, at least two first slaves and at least two second slaves,
   wherein the first path has higher priority than the second path which has higher priority than the third path or the fourth path, and
   wherein each of the 2-port Ethernet modules is configured to
      store, in a path routing table, status about a currently connected path, the currently connected path being one of the first through fourth paths,
      update the path routing table when a path disconnect or a path change is detected, the path disconnect being a disconnect from the currently connected path, the path change being a change from the currently connected path to another of the first through fourth paths, and
      share updated path information with another connected 2-port Ethernet module.

2. The adaptive multi-redundant ring network system of claim 1, wherein each of the 2-port Ethernet communication modules are configured to cooperate in order to
   determine whether the first path is connected or disconnected;
   determine whether to use the second path when the first path is determined to be disconnected;
   use the second path when the first path is determined to be disconnected and the second path is connected; and
   use either of the third path or the fourth path when both the first path and the second path are determined to be disconnected.

3. A method for selecting a detour of an adaptive multi-redundant ring network system including a main network system having a first main control unit and a plurality of first slaves, and a sub-network system having a second main control unit and a plurality of second slaves, the plurality of second slaves being different than the plurality of first slaves, wherein each of the plurality of first slaves and each of the plurality of second slaves include 2-port Ethernet communication modules so as to form: a first path connecting the first main control unit and the plurality of first slaves; a second path connecting the second main control unit and the plurality of second slaves; a third path connecting the first main control unit, at least two first slaves and at least two second slaves; and a fourth path connecting the second main control unit, at least two first slaves and at least two second slaves, and wherein the first path has higher priority than the second path which has higher priority than the third path or the fourth path, the method comprising:
   determining whether the first path is connected or disconnected;
   determining whether to use the second path when the first path is determined to be disconnected;
   using the second path when the first path is determined to be disconnected and the second path is connected; and
   using either of the third path or the fourth path when both the first path and the second path are determined to be disconnected.

4. The method of claim 3, further comprising:
   storing, in a path routing table of the 2-port Ethernet communication modules, status about a currently connected path, the currently connected path being one of the first through fourth paths;
   updating, by the 2-port Ethernet communication modules, the path routing table when a path disconnect or a path change is detected, the path disconnect being a disconnect from the currently connected path, the path change being a change from the currently connected path to another of the first through fourth paths; and
   sharing, by the 2-port Ethernet communication modules, updated path information with another connected 2-port Ethernet module.

5. A method of managing an adaptive multi-redundant ring network system that includes a main network system including a first main control unit and a plurality of first slaves, and a sub-network system including a second main control unit and a plurality of second slaves, the plurality of second slaves being different than the plurality of first slaves, wherein each of the plurality of first slaves and each of the plurality of second slaves include 2-port Ethernet communication modules so as to form: a first path connecting the first main control unit and the plurality of first slaves; a second path connecting the second main control unit and the plurality of second slaves; a third path connecting the first main control unit, at least two first slaves and at least two second slaves; and a fourth path connecting the second main control unit, at least two first slaves and at least two second slaves, and wherein the first path has higher priority than the second path which has higher priority than the third path or the fourth path, the method comprising:

storing, in a path routing table of the 2-port Ethernet communication modules, status about a currently connected path, the currently connected path being one of the first through fourth paths, updating, by the 2-port Ethernet communication modules, the path routing table when a path disconnect or a path change is detected, the path disconnect being a disconnect from the currently connected path, the path change being a change from the currently connected path to another of the first through fourth paths, and sharing, by the 2-port Ethernet communication modules, updated path information with another connected 2-port Ethernet module.

\* \* \* \* \*